United States Patent [19]
Nishida

[11] Patent Number: 5,634,498
[45] Date of Patent: Jun. 3, 1997

[54] LUBRICOUS FLEXIBLE SYNTHETIC HOSE AND METHOD FOR PRODUCING SAME

[75] Inventor: Isamu Nishida, Toyama-ken, Japan

[73] Assignee: Toyox Co., Ltd., Toyama-ken, Japan

[21] Appl. No.: 417,756

[22] Filed: Apr. 6, 1995

[30]  Foreign Application Priority Data

Apr. 7, 1994 [JP] Japan .................................. 6-093823
Oct. 12, 1994 [JP] Japan .................................. 6-272879

[51] Int. Cl.$^6$ .................................................. F16L 11/04
[52] U.S. Cl. ...................... 138/137; 138/141; 138/DIG. 7
[58] Field of Search ................................ 138/141, 137, 138/125, 124, DIG. 7

[56]  References Cited

U.S. PATENT DOCUMENTS

| | | | |
|---|---|---|---|
| 3,927,695 | 12/1975 | Crockwell | 138/137 |
| 4,005,234 | 1/1977 | Stroupe | 138/141 |
| 4,293,415 | 10/1981 | Bente, III et al. | 138/140 |
| 4,299,256 | 11/1981 | Bacehowski et al. | 138/DIG. 7 |
| 4,340,090 | 7/1982 | Matsushita et al. | 138/123 |
| 4,802,938 | 2/1989 | Kitami et al. | 138/141 |
| 4,956,211 | 9/1990 | Saito | 428/36.5 |

Primary Examiner—David Scherbel
Assistant Examiner—James F. Hook
Attorney, Agent, or Firm—Steinberg, Raskin & Davidson, P.C.

[57]  ABSTRACT

A hose capable of exhibiting increased flexibility and lubricity. The hose is made of soft synthetic resin containing a slidability providing silicone resin material. In particular, the slidability providing silicone resin material contained in a surface layer of the hose or ribs formed on a surface of the hose. In production of the hose, re-dispersion of the resin material and forcing of layers of the hose against each other are carried out. Alternatively, a layer containing the resin material and a layer free of the resin material are co-extruded.

10 Claims, 7 Drawing Sheets

Content of Slidability Providing Material (wt%)

LUBRICOUS FLEXIBLE SYNTHETIC HOSE AND METHOD FOR PRODUCING SAME

BACKGROUND OF THE INVENTION

This invention relates to a lubricous flexible synthetic hose and a method for producing the same, and more particularly to a flexible hose of lubricous properties which is made of soft synthetic resin and a method for producing such a hose.

A hose made of a synthetic resin material has been widespread because it exhibits satisfactory durability and workability and is decreased in cost as compared with a hose made of a rubber material.

In order to improve efficiency of operation which a user carries out using a hose, the user desires to use a flexible hose. In order to meet the requirement, a hose generally tends to he made of a soft synthetic resin material decreased in hardness.

Unfortunately, an increase in softness and flexibility of a hose leads to an increase in frictional resistance of the hose and deterioration in slidability of the hose. Deterioration in slidability of a hose causes a failure in lubricous action of the hose, so that the hose is readily caught by an obstacle, to thereby be deteriorated in operability. Also, it leads to an increase in space required for accommodation of the hose wound on a reel.

In order to solve such problems, the prior art has conventionally employed an approach of coating a lubricant material such as silicone oil or the like on a surface of the hose, to thereby reduce frictional resistance of the hose.

However, the approach has a disadvantage of rendering handling of the hose troublesome and failing to permit a decrease in frictional resistance of the hose to be maintained for an increased period of time.

Another approach to the problems is also proposed which is to make a hose of a soft synthetic resin material having such a lubricous material as described above incorporated therein. However, formation of such a soft synthetic resin material into the hose by conventional techniques has a disadvantage of causing the hose to exhibit release characteristics sufficient to deteriorate adhesive strength between an inner layer of the hose and an outer layer thereof.

SUMMARY OF THE INVENTION

The present invention has been made in view of the foregoing disadvantages of the prior art.

Accordingly, it is an object of the present invention to provide a lubricous flexible synthetic hose which is capable of exhibiting increased flexibility and satisfactory lubricous properties.

It is another object of the present invention to provide a lubricous flexible synthetic hose which is capable of ensuring sufficient adhesive or bond strength between an inner layer and an outer layer.

It is a further object of the present invention to provide a method for producing a lubricous flexible synthetic hose which is capable of providing a hose exhibiting increased flexibility and satisfactory lubricous properties while ensuring sufficient adhesive or bond strength between an inner layer and an outer layer.

In accordance with one aspect of the present invention, a lubricous flexible synthetic hose is provided which is made of soft synthetic resin. The soft synthetic resin has a slidability providing silicone resin material contained in at least a part thereof, resulting in providing the hose with satisfactory lubricous properties.

In a preferred embodiment of the present invention, the lubricous flexible synthetic hose includes an inner layer, an outer layer, and a reinforcing layer arranged between the inner layer and the outer layer, wherein the slidability providing silicone resin material is contained in at least the outer layer.

Alternatively, in a preferred embodiment of the present invention, the lubricous flexible synthetic hose may include an inner layer, a reinforcing layer arranged on the inner layer, an intermediate layer arranged on the reinforcing layer and an outer layer arranged on the intermediate layer, wherein the slidability providing silicone resin material is contained in at least the outer layer.

In a preferred embodiment of the present invention, the intermediate layer and outer layer are co-extruded.

In accordance with this aspect of the present invention, a lubricous flexible synthetic hose is provided. The hose includes a hose body made of soft synthetic resin and at least one lubricous section made of soft synthetic resin containing a slidability providing silicone resin material and provided on an outer surface of the hose body, resulting in providing the hose body with satisfactory lubricous properties.

In a preferred embodiment of the present invention, a plurality of the lubricous sections are arranged so as to extend in a longitudinal direction of the hose body. The lubricous sections each are formed into a strip-like section and spaced from each other in a circumferential direction of the hose body.

Alternatively, in a preferred embodiment of the present invention, a plurality of the lubricous sections are arranged so as to intermittently continuous in a longitudinal direction of the hose body. The lubricous sections are formed in an island-like shape and arranged in a dotted manner.

In a preferred embodiment of the present invention, the lubricous section may be arranged in a spiral manner on the hose body.

Also, in a preferred embodiment of the present invention, the lubricous sections each may comprise a rib formed on the hose body so as to outwardly project therefrom, wherein the ribs are arranged so as to extend in a longitudinal direction of the hose body and be spaced from each other in a circumferential direction of the hose body.

In accordance with another aspect of the present invention, a method for producing a lubricous flexible synthetic hose of soft synthetic resin is provided. The method comprises the steps of traveling an inner layer while forming it and extruding a kneaded mixture of soft synthetic resin and a slidability providing silicone resin material to an outside of the inner layer during traveling of the inner layer, to thereby form an outer layer outside the inner layer.

The extrusion is carried out by means of an extruder die provided with a re-dispersion section for carrying out re-dispersion of the mixture. The method further comprises the step of tightly bonding the inner layer and outer layer to each other by means of a forcing means arranged on a downstream side of the extruder die defined in a direction of traveling of the inner layer.

In a preferred embodiment of the present invention, the method further comprises the step of forming an intermediate layer between the inner layer and the outer layer, wherein the inner layer and intermediate layer are made of soft synthetic resin free of the slidability providing silicone resin material and the outer layer and the inner or intermediate layer are formed by co-extrusion.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate like or corresponding parts throughout; wherein.

DETAILED DESCRIPTION OF THE PREFERRED EMBODIMENTS

Now, the present invention will be described hereinafter with reference to the accompanying drawings.

Figure 1:
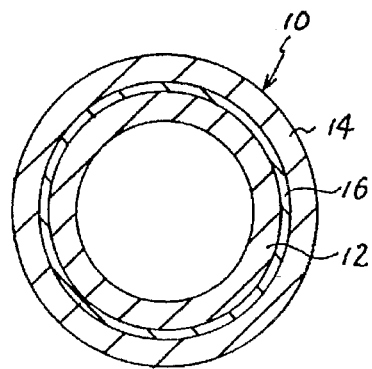
FIG. 1 is a sectional view showing a first embodiment of a lubricous flexible synthetic hose according to the present invention.
Figure 2:
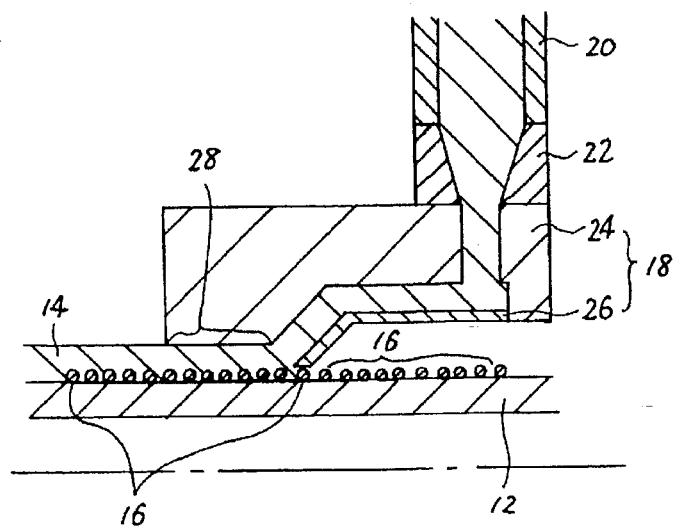
FIG. 2 is a sectional view showing an example of an apparatus suitable for producing the lubricous flexible synthetic hose shown in FIG. 1.
Figure 3:
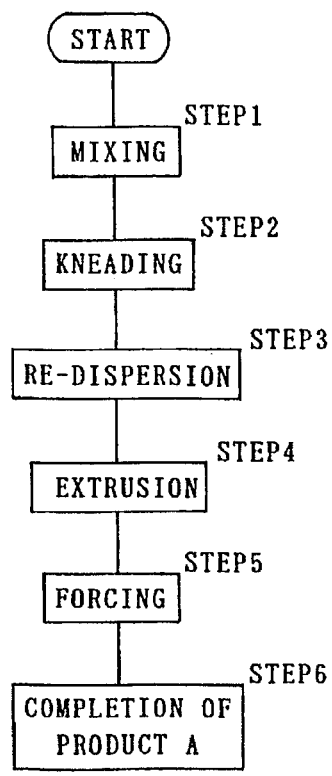
FIG. 3 is a flow chart showing steps of production of the lubricous flexible synthetic hose shown in FIG. 1.

Referring first to FIGS. 1 to 3, a first embodiment of a lubricous flexible synthetic hose according to the present invention is illustrated. A lubricous flexible synthetic hose of the first embodiment which is generally designated at reference numeral 10 includes an inner layer or section 12, an outer layer or section 14, and a reinforcing layer or section 16 made of reinforcing yarns and arranged between the inner layer 12 and the outer layer 14.

The hose 10 of the first embodiment thus constructed may be produced by means of an apparatus constructed in such a manner as shown in FIG. 2 and according to such a procedure as shown in FIG. 3. The inner layer 12 may be formed according to any suitable conventional techniques.

More particularly, a starting material for the outer layer 14 and a slidability providing silicone resin material are mixed (step 1) and then kneaded (step 2), to thereby prepare a kneaded mixture. The kneaded mixture thus prepared is then fed to an extruder die 18 by means of a feeder 20, during which the mixture is passed through a re-diffusion section 22 for carrying out re-dispersion of the slidability providing silicon resin material in the mixture, to thereby cause the slidability providing silicone resin material to be more uniformly dispersed in the kneaded mixture (step 3). Subsequently, the kneaded mixture is formed into a hose-like shape by cooperation of a die member 24 and a nipple 26 which constitute the extruder die 18 (step 4) and then forced against the reinforcing layer 16 and inner layer 12 by means of a forcing section 28 formed at the die member 24 (step 5), followed by completion of a product A which is the lubricous flexible synthetic hose 10 of the first embodiment (step 6).

Figure 4:
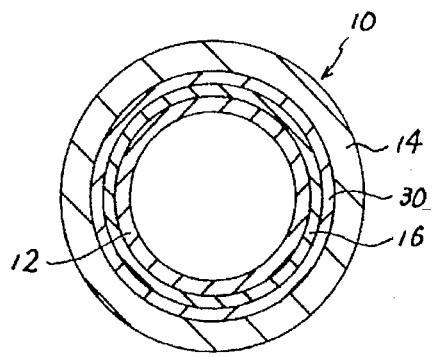
FIG. 4 is a sectional view showing a second embodiment of a lubricous flexible synthetic hose according to the present invention.
Figure 5:
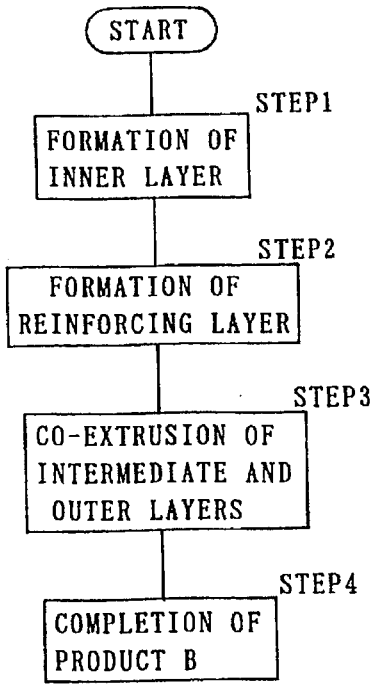
FIG. 5 is a flow chart showing steps of production of the lubricous flexible synthetic hose shown in FIG. 4.

Referring now to FIGS. 4 and 5, a second embodiment of a lubricous flexible synthetic hose according to the present invention is illustrated. A lubricous flexible synthetic hose 10 of the second embodiment generally includes an inner layer 12, an intermediate layer 30, an outer layer 14 and a reinforcing layer 16 made of reinforcing yarns and arranged between the inner layer 12 and the intermediate layer 30.

The hose 10 of the second embodiment may be produced according to a procedure shown in FIG. 5. More particularly, first the inner layer 12 is formed according to any suitable conventional techniques as in the first embodiment described above (Step 1) and then the reinforcing yarns are wound on the inner layer 12 to provide the reinforcing layer 16 (Step 2). Then, the intermediate layer 30 and outer layer 14 are formed by co-extrusion (Step 3), followed by completion of a product B which is the lubricous flexible synthetic hose 10 of the second embodiment (Step 4).

In the first embodiment, the outer layer 14 contains a slidability providing silicone resin material, to thereby disadvantageously exhibit release properties sufficient to deteriorate adhesion between the inner layer 12 and the outer layer 14. Such a disadvantage particularly remarkably appears when the reinforcing layer 16 made of reinforcing yarns is arranged between the inner layer 12 and the outer layer 14 while being wound on the inner layer 12, because the inner layer 12 is decreased in temperature during winding of the reinforcing layer 16 thereon, leading to a failure in satisfactory adhesion between the inner layer 12 and the outer layer 14 extruded onto the inner layer 12. The second embodiment effectively eliminates such a disadvantage, because the intermediate layer 30 and outer layer 14 are co-extruded, to thereby ensure sufficient adhesion between both layers 12 and 14.

Figure 6:
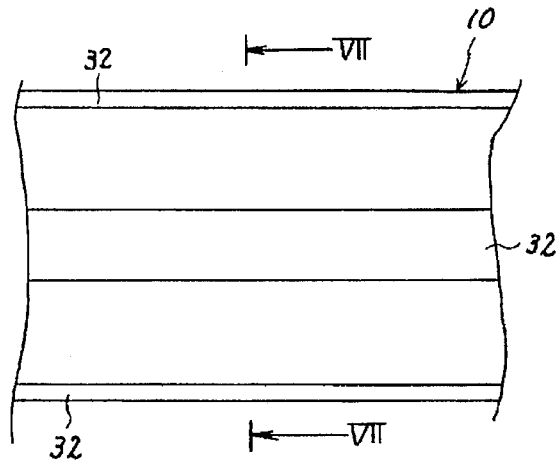
FIG. 6 is a fragmentary front elevation view showing a third embodiment of a lubricous flexible synthetic hose according to the present invention.
Figure 7:
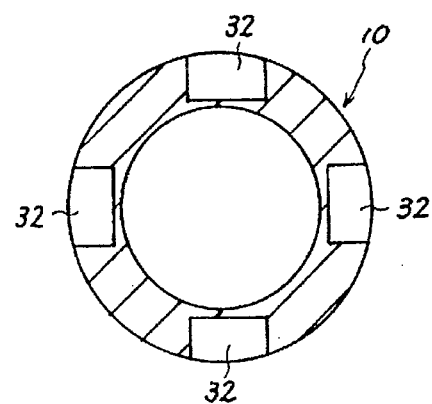
FIG. 7 is a sectional view taken along line VII—VII of FIG. 6.

Referring now to FIGS. 6 and 7, a third embodiment of a lubricous flexible synthetic hose according to the present invention is illustrated. A lubricous flexible synthetic hose 10 of the third embodiment includes a hose body which is provided on an outer surface thereof with at least one strip-like lubricous section 32. The lubricous section 32 may be made of soft synthetic resin containing a slidability providing silicone resin material, resulting in providing the hose body with satisfactory lubricity or lubricous properties. The hose body may include an inner layer, an outer layer and a reinforcing layer arranged between the inner layer and the outer layer as in the first embodiment. The inner and outer layers may be made of soft synthetic resin free of the above-described slidability providing silicone resin material. In the illustrated embodiment, four such lubricous strips 32 are arranged in a manner to extend in a longitudinal direction of the hose body and so as to be spaced from each other in a circumferential direction of the hose 10. The lubricous section 32 may be formed of the same material as the outer layer 14 of the hose 10 of each of the first and second embodiments described above. Such formation of the lubricous section 32 into a strip-like shape permits the amount of slidability providing silicone resin material used to be significantly reduced as compared with the case that it is contained in the whole hose 10 or outer layer 14. The remaining part of the third embodiment may be constructed in substantially the same manner as the first or second embodiment.

Figure 8:
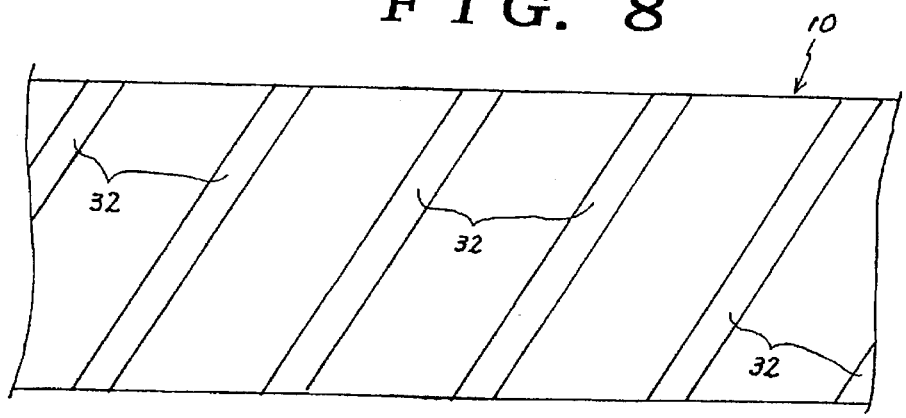
FIG. 8 is a fragmentary front elevation view showing a fourth embodiment of a lubricous flexible synthetic hose according to the present invention.

FIG. 8 shows a fourth embodiment of a lubricous flexible synthetic hose according to the present invention. A lubricous flexible synthetic hose 10 of the fourth embodiment may be constructed in substantially the same manner as the above-described third embodiment except that at least one strip-like lubricous section 32 is arranged in a spiral manner on an outer surface of a hose body of the hose 10. Thus, it will be noted that the fourth embodiment exhibits substantially the same function and advantage as the third embodiment.

Figure 9:
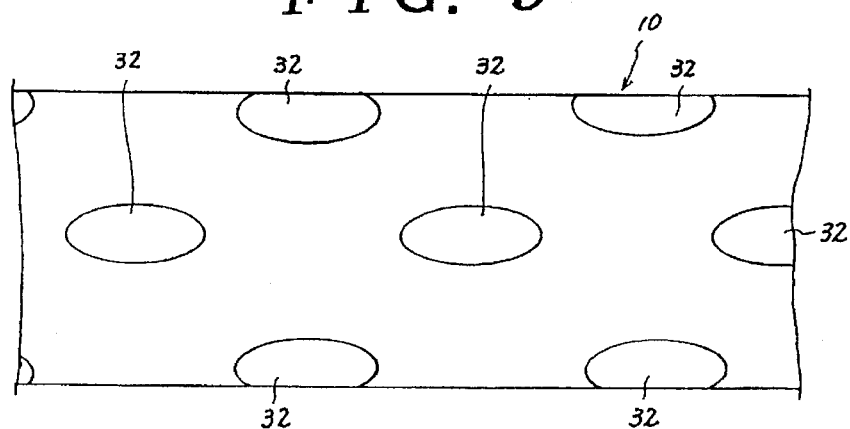
FIG. 9 is a fragmentary front elevation view showing a fifth embodiment of a lubricous flexible synthetic hose according to the present invention.

Referring now to FIG. 9, a fifth embodiment of a lubricous flexible synthetic hose according to the present invention is illustrated. A lubricous flexible synthetic hose 10 of the fifth embodiment includes a hose body which is provided on an outer surface thereof with a plurality of island-like lubricous sections 32 in a dotted manner and so as to be intermittently continuous in a longitudinal direction of the hose 1. Thus, it will be noted that the fifth embodiment may exhibit substantially the same function and advantage as each of the third and fourth embodiments. The remaining part of the fifth embodiment may be constructed in substantially the same manner as the third embodiment.

Figure 10:
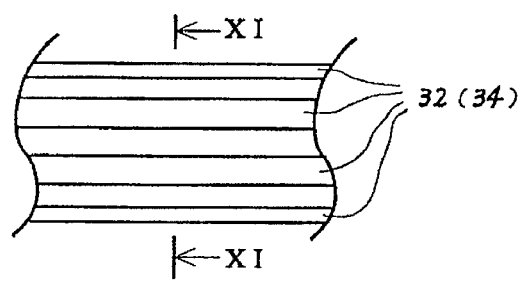
FIG. 10 is a fragmentary front elevation view showing a sixth embodiment of a lubricous flexible synthetic hose according to the present invention.
Figure 11:
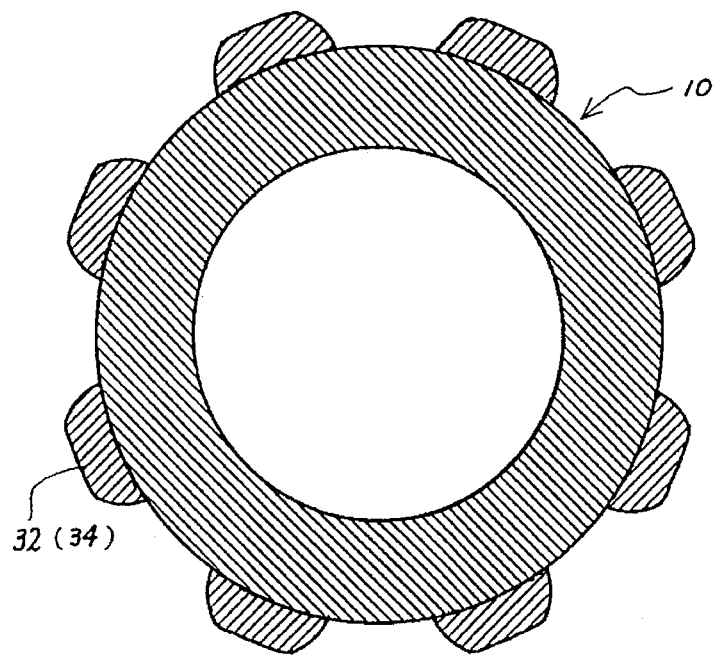
FIG. 11 is an enlarged sectional view taken along line XI—XI of FIG. 10.

Referring now to FIGS. 10 and 11, a sixth embodiment of a lubricous flexible synthetic hose according to the present invention is illustrated. A lubricous flexible synthetic hose 10 of the sixth embodiment includes a hose body which is provided on an outer surface thereof with at least one lubricous section 32. In the sixth embodiment, a plurality of lubricous sections 32 are arranged on the hose body. The lubricous sections 32 each comprise a strip-like rib 34 formed on the hose body in a manner to outwardly project therefrom and arranged so as to extend in a longitudinal direction of the hose body. The strip-like ribs 34 are also arranged in a manner to be spaced from each other in a circumferential direction of the hose body. The ribs 34 are made of soft synthetic resin containing a slidability providing silicone resin material, resulting in the hose body with satisfactory lubricity or lubricous properties. The remaining part of the sixth embodiment may be constructed in substantially same manner as any one of third to fifth embodiments described above. Thus, it will be noted that the fifth embodiment may exhibit substantially the same function and advantage as the third to fifth embodiments. Also, the above-described construction of the sixth embodiment permits only the ribs 34 exhibiting lubricous properties to be contacted with an article, an obstacle or the like, to thereby ensure slidability of the hose and a decrease in contact area and therefore frictional resistance.

Now, the present invention will be further described with reference to various tests carried out on the lubricous flexible synthetic hose of the present invention.

Lubricity Performance Test 1

A lubricity performance test was carried out on the lubricous flexible synthetic hose of the present invention and a conventional hose. For this purpose, a prior art hose, and products A, B and C of the present invention were used as test samples as shown in Table 1.

TABLE 1

| | Test Samples | | | |
|---|---|---|---|---|
| | Prior Art | Product A | Product B | Product C |
| Specification | 6.3 | 6.3 | 6.3 | 6.3 |
| Inner Diameter (mm) | 6.1 | 6.2 | 6.2 | 6.2 |
| Outer Diameter (mm) | 9.9 | 9.7 | 9.8 | 9.7 |
| Material | | | | |
| Inner Layer | Polyurethane | Polyurethane | Polyurethane | Polyurethane |
| Intermediate Layer | — | — | Polyurethane | — |
| Outer Layer | Polyurethane | Polyurethane (90%) AS-170 (10%) | Polyurethane (90%) AS-170 (10%) | — |
| Rib | — | — | — | Polyurethane (90%) AS-170 (10%) |
| Reinforcing Layer | Polyester | Polyester | Polyester | Polyester |

Product A of the present invention described above was constructed of the inner layer 12 made of polyurethane, the outer layer 14 made of polyurethane (90%) containing Shin-Etsu Polymer AS-170 (10%) commercially available from Shin-Etsu Polymer Kabushiki Kaisha as the slidability providing silicone resin material, and the reinforcing layer 16 made of polyester. Product B of the present invention was constructed of the inner layer 12 made of polyurethane, the intermediate layer 30 made of polyurethane, the outer layer 14 made of polyurethane (90%) containing Shin-Etsu Polymer AS-170 (10%), and the reinforcing layer 16 made of polyester. Product C of the present invention was constructed of the inner layer 12 made of polyurethane, the reinforcing layer 16 made of polyester and the ribs 34 made of polyurethane (90%) containing Shin-Etsu Polymer AS-170 (10%). The prior art hose was constructed of an inner layer made of polyurethane, an outer layer made of polyurethane and a reinforcing layer made of polyester yarns and arranged between the inner layer and the outer layer.

Figure 12:
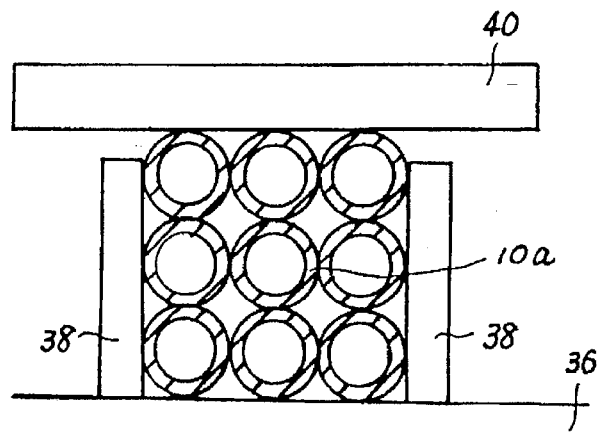
FIGS. 12 and 13 each are a schematic view showing the manner of a lubricity performance test.
Figure 13:
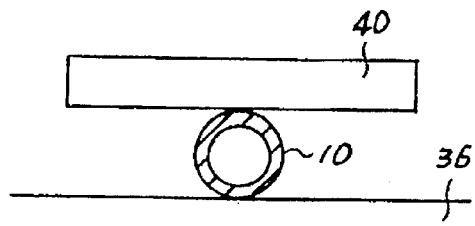

In order to evaluate lubricity performance of each of the test samples, frictional resistance between hoses and that between a hose and an iron plate were measured on each of the test samples as shown in FIGS. 12 and 13. More particularly, frictional resistance between hoses, as shown in FIG. 12, was measured by putting nine (9) hose pieces of about 10 cm in length on an iron plate 36 and restraining them by means of a frame 38. Then, an iron plate 40 was put on the pipe pieces and then a central pipe piece 10a was drawn out of the pipe pieces, so that force required for drawing out the pipe piece 10a was measured by means of a spring balance.

Also, frictional resistance between a hose and an iron plate, as shown in FIG. 13, was measured by interposedly arranging a hose piece 10 between the iron plates 36 and 40 and drawing out the hose piece 10 from between the iron plates, so that force required for drawing out the hose piece 10 was measured by means of the spring balance. The iron plate 12 put on the pipe piece 10 was 2347 g in weight.

Results of the test were as shown in Table 2.

TABLE 2

| Frictional Resistance (kgf) | Prior Art | Products A and B | Product C |
| --- | --- | --- | --- |
| Between Hoses | 5.0 | 1.0 | 0.8 |
| Between Hose and Iron Plate | 5.0 | 2.0 | 1.6 |

As shown in Table 2, the products A to C of the present invention each were highly improved in lubricity or lubricous properties both between the hoses and between the hose and the iron plate as compared with the prior art. The products A and B were not different in lubricous properties and the product C was increased in lubricous properties as compared with the products A and B.

Lubricity Performance Test 2

Lubricity Performance Test 1 described above was substantially repeated while varying the amount of Shin-Etsu Polymer AS-170 used as the slidability providing silicone resin material. Test samples were prepared in substantially the same manner as the product A described above while setting the content of Shin-Etsu Polymer AS-170 at 5%, 7%, 10% and 30%.

Figure 14:
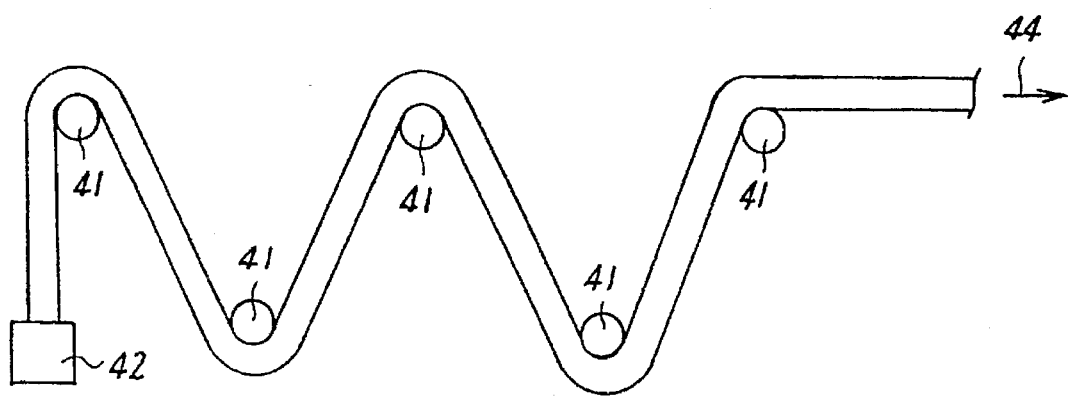
FIG. 14 is a schematic view showing the manner of another lubricous performance test.

In order to evaluate lubricity performance of the test samples, lubricity of each of the test samples with respect to a PVC pipe (diameter: 100 mm) was measured. More particularly, as shown in FIG. 14, a hose or each of the test samples was passed round five (5) PVC pipes 41 in order. Then, a weight 42 of 5 kg was mounted on one end of the hose and then the hose was drawn at the other end thereof in a direction indicated at an arrow 44 in FIG. 14, so that force required for causing movement of the weight 42 to be started was measured.

Figure 15:
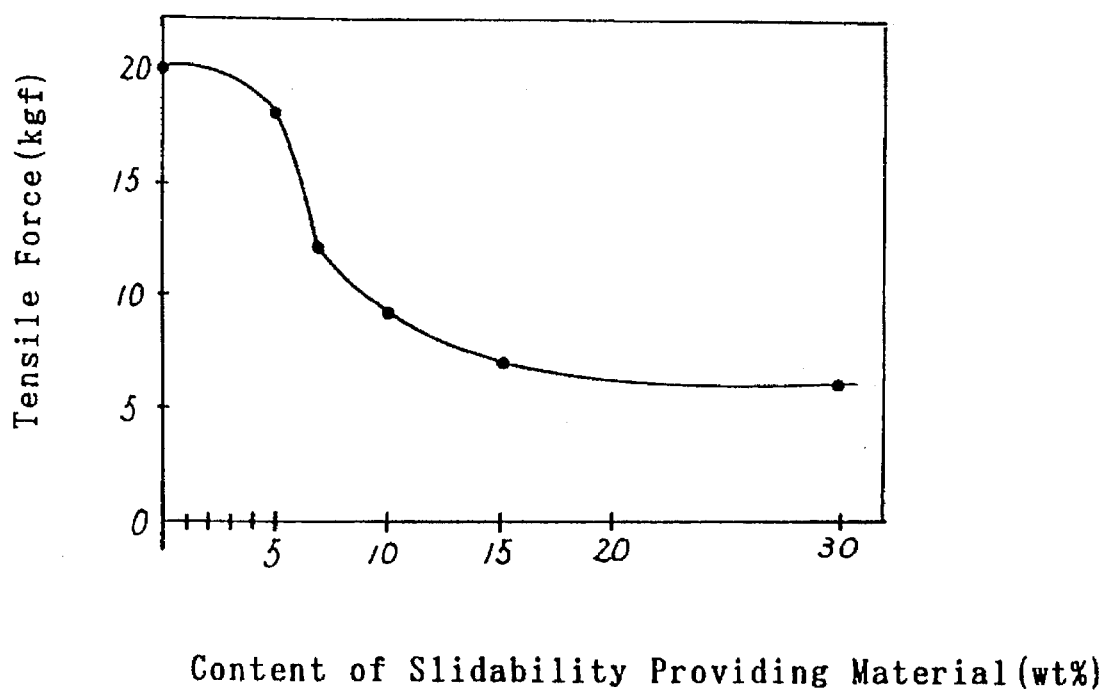
FIG. 15 is a graphical representation showing results of the lubricity performance test shown in FIG. 14.

Results of the measurement were as shown in Table 3 and FIG. 15.

TABLE 3

| Test Samples | Prior Art Hose | Products A and B | | | | |
| --- | --- | --- | --- | --- | --- | --- |
| Content of Slidability Providing Material (%) | 0 | 5 | 7 | 10 | 15 | 30 |
| Tensile Force (kgf) | 20 | 18 | 12 | 9.5 | 7 | 6 |

The results indicate that a content of the slidability providing silicone resin material below 5% renders uniform dispersion of the slidability providing silicone resin material difficult, to thereby fail to improve lubricous properties or lubricity performance of the hose. The content above 30% causes the lubricous properties or lubricity performance to be improved because it leads to an increase in the amount of silicone. However, it deteriorates applicability of ink to the hose, to thereby cause marking on the hose to be failed. Thus, it was found that that the content is desirably between 7% by weight and 30% by weight.

Accommodation Test

Figure 16:
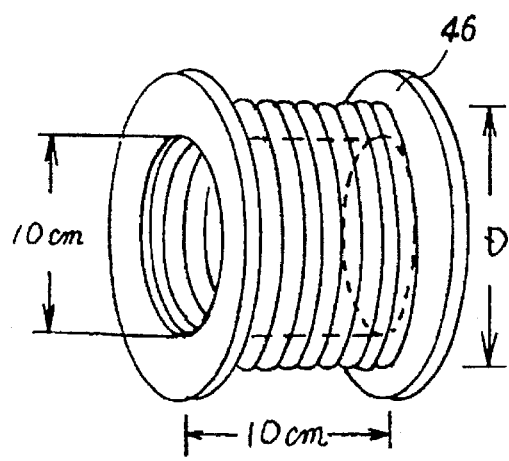
FIG. 16 is a schematic perspective view showing the manner of a hose accommodation test.

Each of test samples of 10 m in length was wound on a bobbin 46 of 10 cm in diameter and 10 cm in width for accommodation as shown in FIG. 16. The winding was carried out by turning a handle (not shown) provided on the bobbin 46.

In order to evaluate a space required for accommodation of the hose, a maximum diameter D of the hose wound on the bobbin and a length of time required for the winding were measured. The test was carried out on the prior art hose and the products A and B of the present invention.

Results of the test were as shown in Table 4.

TABLE 4

| Test Sample | Prior Art | Present invention |
| --- | --- | --- |
| D (cm) | 18 to 20 | 16 to 17 |
| Time (sec) | 20 to 25 | 10 to 14 |

Table 4 indicates that the hose of the present invention permits the accommodation space to be significantly reduced as compared with the prior art. Also, as will be noted from Table 4, the hose of the present invention permitted time for required for the accommodation to be reduced as the prior art. There was no significant difference in accommodation properties between the products A and B of the present invention.

Figure 17:
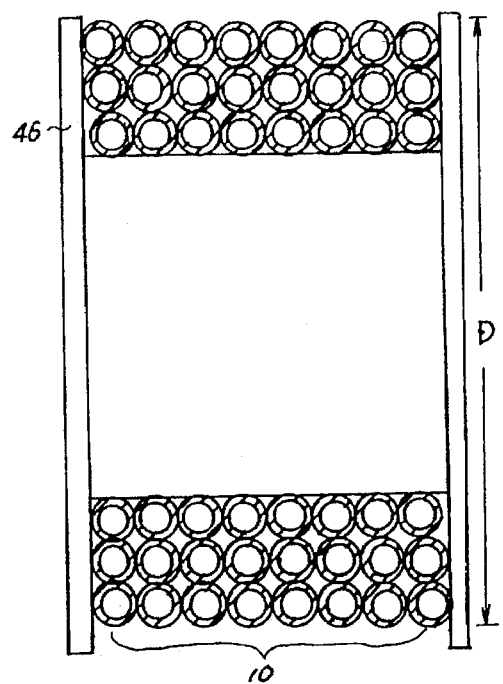
FIGS. 17 and 18 each are a schematic view showing results of a hose accommodation test.
Figure 18:
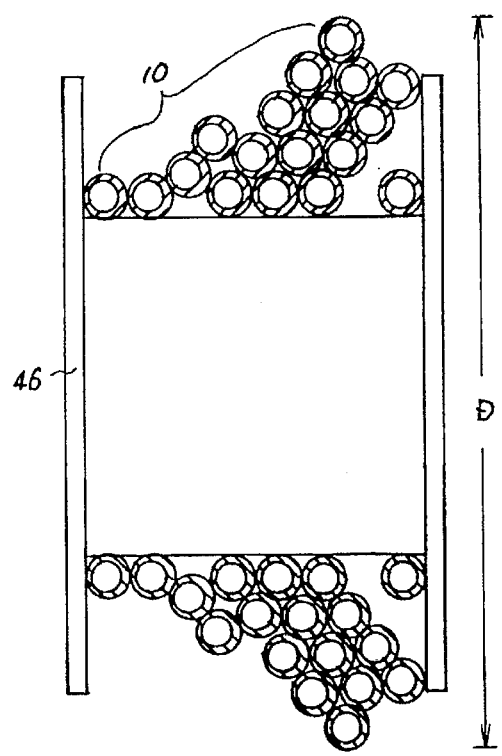

The results would be due to the fact that improved lubricous properties exhibited by the hose of the present invention permit the hose to be orderly or regularly wound on the bobbin 46 as shown in FIG. 17, whereas deteriorated lubricous properties of the prior art hose causes gaps to be formed in windings of the hose on the bobbin as shown in FIG. 18. Thus, winding of the prior art hose on the bobbin requires to turn the bobbin 46 by one hand while holding it by the other hand, whereas winding of the hose of the present invention can be readily accomplished by only one hand.

Traveling Test

The materials for the prior art hose and product B shown in Table 1 described above were used for producing a prior art hose and a hose of the present invention each of 35 mm in inner diameter for a vacuum cleaner, respectively, which were then subject to a traveling test. For this purpose, each of the hoses was connected at one end thereof to a vacuum cleaner and at the other end thereof to a small robot for traction used for cleaning a tight space, followed by cleaning of a duct. In the test, a distance by which each of the hoses failed to travel due to friction between the hose and a traveling path was measured.

Results of the test were as shown in Table 5.

TABLE 5

| | Prior Art | Present Invention |
| --- | --- | --- |
| Traveling Distance (m) | 7–8 | 30 |

The prior art hose was 7 to 8 m in traveling distance, whereas a traveling distance of the hose of the present invention was 30 m. Thus, it will be noted that the hose of the present invention can be increased in traveling distance without increasing power of the robot for traction.

In the illustrated embodiment, polyurethane is used as the soft synthetic resin for the outer layer of the hose. Alternatively, soft vinyl chloride, a copolymer of soft vinyl chloride and any other resin, or the like which have been conventionally used for a flexible hose may be used for this purpose.

As can be seen from the foregoing, the hose of the present invention exhibits satisfactory workability and accommodation properties because it is significantly increased in flexibility and lubricity.

Also, when the hose of the present invention is so constructed that the hose body is provided thereon with the lubricous sections, the amount of slidability providing silicone resin material used may be substantially decreased to reduce a manufacturing cost of the hose. In particular, when the lubricous sections each comprise the rib, a contact surface between the hoses or between the hose and a floor is significantly reduced, to thereby further increase slidability of the hose.

Further, the present invention permits the hose to be increased in adhesion or bond strength between the inner layer and the outer layer containing the slidability providing silicone resin material.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A lubricous flexible synthetic hose made of soft synthetic resin, comprising:

an inner layer;

an outer layer, said outer layer formed of a soft synthetic resin and a silicone resin material dispersed in said soft synthetic resin providing the hose with satisfactory lubricous properties;

a reinforcing layer arranged between said inner layer and said outer layer for providing reinforcement of hose; and an intermediate layer arranged on said reinforcement layer and between said inner layer and said outer layer, said intermediate layer being formed of soft synthetic resin without silicone resin material, said outer layer being arranged on said intermediate layer.

2. A lubricous flexible synthetic hose as defined in claim 1, wherein said intermediate layer and said outer layer are co-extruded.

3. A lubricous flexible synthetic hose comprising:

a hose body made of soft synthetic resin, said hose body comprising at least one section having an external surface, wherein said at least one section is formed of a soft synthetic resin and a silicone resin material dispersed in said soft synthetic resin, providing said hose body with satisfactory lubricous properties, said hose body including an inner layer defining an interior passage in said hose body, and an intermediate layer arranged between said inner layer and said outer layer and being made of the soft synthetic resin without silicone resin material.

4. A lubricous flexible synthetic hose as defined in claim 3, wherein a plurality of said lubricous sections are arranged so as to extend in a longitudinal direction of said hose body.

5. A lubricous flexible synthetic hose as defined in claim 4, wherein said lubricous sections each are formed into a strip-like section and spaced from each other in a circumferential direction of said hose body.

6. A lubricous flexible synthetic hose as defined in claim 3, wherein a plurality of said lubricous sections are arranged so as to intermittently continuous in a longitudinal direction of said hose body.

7. A lubricous flexible synthetic hose as defined in claim 6, wherein said lubricous sections are formed in an island-like shape and arranged in a dotted manner.

8. A lubricous flexible synthetic hose as defined in claim 3, wherein said lubricous section is arranged in a spiral manner on said hose body.

9. A lubricous flexible synthetic hose as defined in claim 3, wherein a plurality of said lubricous sections are arranged on said hose body;

said lubricous sections each comprising a rib formed on said hose body so as to outwardly project therefrom;

said ribs being arranged so as to extend in a longitudinal direction of said hose body and be spaced from each other in a circumferential direction of said hose body.

10. A method for producing a lubricous flexible synthetic hose of soft synthetic resin, comprising the steps of:

providing an inner layer having a through passage, and co-extruding an outer layer made of soft synthetic resin and a slidability providing silicone resin material dispersed in the soft synthetic resin and an intermediate layer around the inner layer such that the intermediate layer is interposed between the inner and the outer layer, the intermediate layer being made of the soft synthetic resin free of the slidability providing silicone resin material and being in contact with the outer layer.

* * * * *